(12) United States Patent
Zhang et al.

(10) Patent No.: US 7,190,829 B2
(45) Date of Patent: Mar. 13, 2007

(54) SPEEDUP OF FACE DETECTION IN DIGITAL IMAGES

(75) Inventors: Lei Zhang, Beijing (CN); Mingjing Li, Beijing (CN); Hong-Jiang Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 791 days.

(21) Appl. No.: 10/610,245

(22) Filed: Jun. 30, 2003

(65) Prior Publication Data

US 2004/0264744 A1 Dec. 30, 2004

(51) Int. Cl.
*G06K 9/00* (2006.01)

(52) U.S. Cl. .................................... 382/165; 382/118

(58) Field of Classification Search ............... 382/118, 382/165, 181, 190, 260
See application file for complete search history.

(56) References Cited

U.S. PATENT DOCUMENTS

| | | | | |
|---|---|---|---|---|
| 6,148,092 | A * | 11/2000 | Qian | 382/118 |
| 6,574,354 | B2 * | 6/2003 | Abdel-Mottaleb et al. | 382/118 |
| 7,110,575 | B2 * | 9/2006 | Chen et al. | 382/118 |

OTHER PUBLICATIONS

Garcia, et al "Face Detection Using Quantize Skin Color Regions Merging and Wavelet Packet Analysis" IEEE, pp. 264-277, 1999.*
Viola, et al "Rapid Object Detection Using a Boosted Cascade of Simple Features", computer vision and pattern recognition, pp. 1-9, 2001.*
Gabbur "Detection and Segmentation of Human Faces in Color Images With Complex Backgrounds", ECE#532-Computer vision project report, pp. 1-32, 2001.*
Vapnik; "Statistical Learning Theory"; 1998; A Volume in the Wiley Series on Adaptive and Learning Systems for Signal Processing, Communications, andControl; Simon Haykin, Series Editor.
Fleuret et al; "Course-to-Fine Face Detection"; International Journal of Computer Vision 2001, 23 pages.
Freund et al.; "A Decision-Theoretic Generalization of On-Line Learning and an Application to Boosting*"; Journal of Computer and System Sciences 55, 1997, Article No. SS971504; pp. 119-139.
Li et al.; "Statistical Learning of Multi-view Face Detection"; 15 pages. Microsoft Research Asia.
Pentland et al.; "View-Based and Modular Eigenspaces for Face Recognition"; 1994 IEEE; pp. 84-91.
Bichsel et al.; "Human Face Recognition and the Face Image Set's Topology"; Image Understanding vol. 59, No. 2, Mar. pp. 254-261, 1994.
Osuna et al.; "Training Support Vector Machines: an Application to Face Detection"; 1997 IEEE; pp. 130-136.
Hsu et al.; "Face Detection in Color Images"; 2002 IEEE; pp. 696-706.

(Continued)

*Primary Examiner*—Daniel Miriam
(74) *Attorney, Agent, or Firm*—Lee & Hayes, PLLC (57) ABSTRACT

Improved methods and apparatuses are provided for use in face detection. The methods and apparatuses significantly reduce the number of candidate windows within a digital image that need to be processed using more complex and/or time consuming face detection algorithms. The improved methods and apparatuses include a skin color filter and an adaptive non-face skipping scheme.

56 Claims, 3 Drawing Sheets

OTHER PUBLICATIONS

Sung et al; "Example-Based Learning for View-Based Human Face Detection"; IEEE Transactions on Pattern Analysis and Machine Intelligence, vol. 20, No. 1, Jan. 1998; pp. 39-50.

Ng et al.; "Multi-View Face Detection and Pose Estimation Using A Composite Support Vector Machine accross the View Sphere"; 1999 IEEE; pp. 14-21.

Rowley et al.; "Neural Network-Based Face Detection"; IEEE Transactions on Pattern Analysis and Machine Intelligence, vol. 20, No. 1, Jan. 1998.

Papageorgiou et al.; "A General Framework for Object Detection"; 1998 The Institute of Electrical and Electronics Engineers, Inc.; pp. 555-563.

"The Boosting Approach to Machine Learning An Overview", Robert E. Schapire, Dec. 19, 2001, MSRI Workshop on Nonlinear Estimation and Classification, 2002, pp. 1-23.

"Robust Real-time Object Detection", Viola et al., Jul. 13, 2001, Second International Workshop on Statistical and Computational Theories of Vision-Modeling, Learning, Computing, and Sampling, pp. 1-25.

"Feature Selection for Face Detection", Serre et al., Sep. 2000, Massachusetts Institute of Technology, 2000, A.I. Memo No. 1697, C.B.C.L Paper No. 192, 17 pages.

"A SNoW-Based Face Detector", Roth et al., Department of Computer Science and the Beckman Institute, University of Illinois at Urbana-Champaign, 7 pages.

"A Statistical Method for 3D Object Detection Applied to Faces and Cars", Schneiderman et al., Robotics Institute, Carnegie Mellon University, 6 pages.

* cited by examiner

SPEEDUP OF FACE DETECTION IN DIGITAL IMAGES

TECHNICAL FIELD

This invention relates to computers and software, and more particularly to methods, apparatuses and systems for use in detecting one or more faces within a digital image.

BACKGROUND OF THE INVENTION

There is an on-going need for methods and apparatuses that allow computers and other like devices to detect human faces within digital images. This task, which is known as face detection, typically requires the detecting device/logic to examine/process thousands if not millions of candidate windows within a digital image in an effort to locate portion(s) of the image that probably contain a human face. Conventional techniques call for the image data within the candidate windows to be manipulated and examined in various different positions and/or scales. All of this processing can lead to slow detection speeds.

It would be useful, therefore, to provide improved methods, apparatuses and/or systems that increase the detection speed. One way to do this is to quickly reduce the number of candidate windows that need to be processed and examined. The resulting speedup of face detection would be beneficial in a variety of computer and machine-based applications.

SUMMARY OF THE INVENTION

Improved methods, apparatuses and systems are provided that significantly increase the face detection speed by reducing the number of candidate windows that need to be processed and examined by more complex and/or time-consuming face detection processes.

By way of example, the above stated needs and others are satisfied by a method for use in face detection. Here, the method includes establishing a plurality of initial candidate windows within a digital image that has a plurality of pixels represented by color space information. For each initial candidate window, the method also includes examining the color space information for each of at least a portion of the pixels within the initial candidate window and classifying each of the examined pixels as being either a skin color pixel or a non-skin color pixel. The method also includes establishing a plurality of subsequent candidate windows that includes at least a portion of the initial candidate windows based on the classified pixels within each of the initial candidate windows.

In certain other implementations, the method also includes processing the subsequent candidate windows using a face detector. The method may further include applying an adaptive non-face skipping scheme to establish a plurality of further processed candidate windows that includes a subset of the plurality of subsequent candidate windows.

The above needs and/or other are also met by a method for use in face detection that includes establishing a plurality of candidate windows within a digital image, classifying at least one of the candidate windows as a non-face window, determining a confidence score for the classified candidate window, and based on the confidence score selectively skipping further classification of at least one spatially neighboring candidate window.

In certain implementations, the method may also include applying a skin color filter to each of a larger plurality of initial candidate windows prior to establishing the plurality of candidate windows.

BRIEF DESCRIPTION OF THE DRAWINGS

A more complete understanding of the various methods and apparatuses of the present invention may be had by reference to the following detailed description when taken in conjunction with the accompanying drawings wherein.

DETAILED DESCRIPTION

Exemplary Computing Environment

Figure 1:
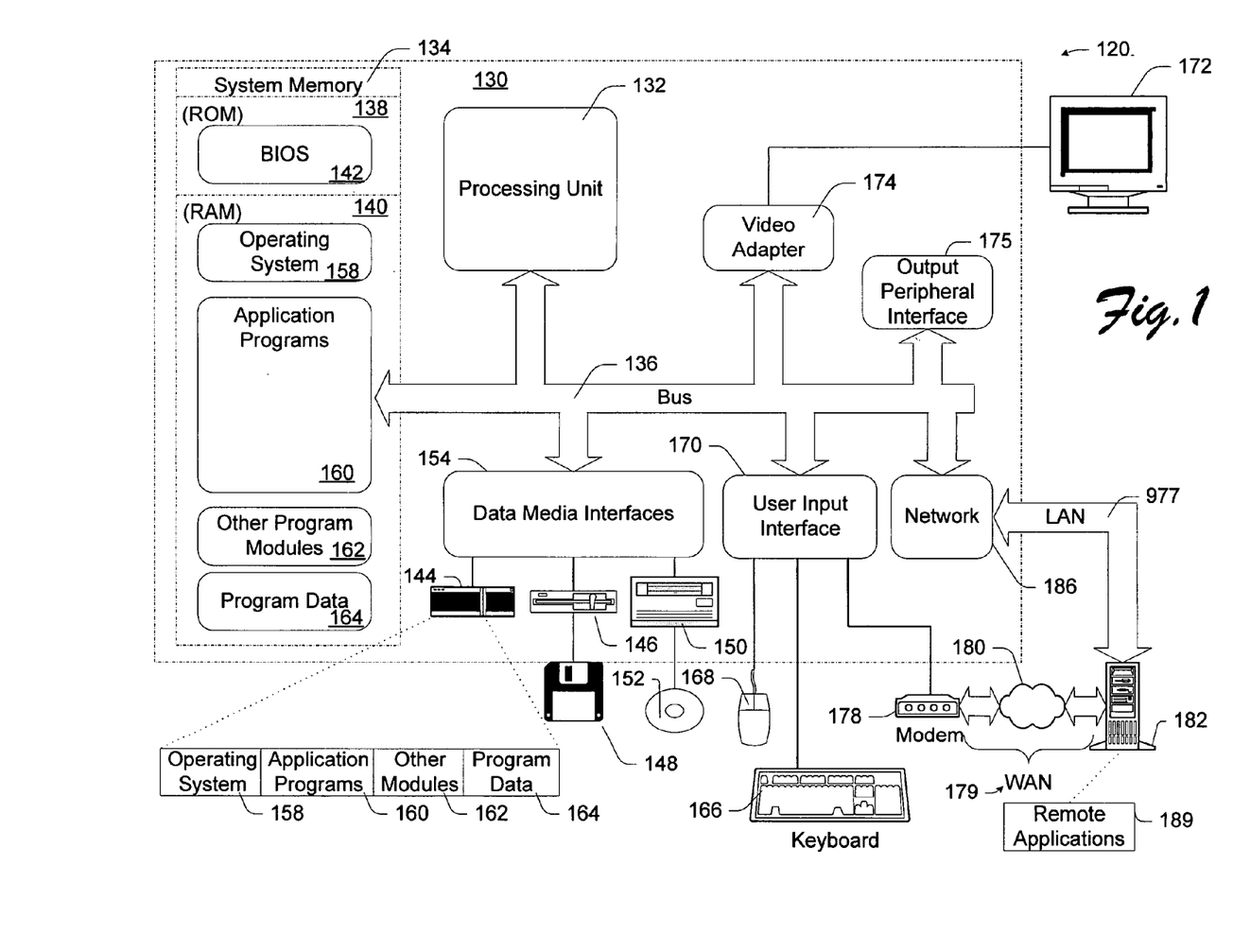
FIG. 1 is a block diagram depicting an exemplary computer system, in accordance with certain exemplary implementations of the present invention.

FIG. 1 illustrates an example of a suitable computing environment 120 on which the subsequently described methods and arrangements may be implemented.

Exemplary computing environment 120 is only one example of a suitable computing environment and is not intended to suggest any limitation as to the scope of use or functionality of the improved methods and arrangements described herein. Neither should computing environment 120 be interpreted as having any dependency or requirement relating to any one or combination of components illustrated in computing environment 120.

The improved methods and arrangements herein are operational with numerous other general purpose or special purpose computing system environments or configurations.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media.

In FIG. 1, system memory 134 includes computer readable media in the form of volatile memory, such as random access memory (RAM) 140, and/or non-volatile memory, such as read only memory (ROM) 138. A basic input/output system (BIOS) 142, containing the basic routines that help to transfer information between elements within computer 130, such as during start-up, is stored in ROM 138. RAM 140 typically contains data and/or program modules that are immediately accessible to and/or presently being operated on by processor 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM, CD-R, CD-RW, DVD-ROM, DVD-RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system 158, one or more application programs 160, other program modules 162, and program data 164.

The improved methods and arrangements described herein may be implemented within operating system 158, one or more application programs 160, other program modules 162, and/or program data 164.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175.

Computer 130 may operate in a networked environment using logical connections to one or more remote computers, such as a remote computer 182. Remote computer 182 may include many or all of the elements and features described herein relative to computer 130.

Logical connections shown in FIG. 1 are a local area network (LAN) 177 and a general wide area network (WAN) 179. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180.

In a networked environment, program modules depicted relative to computer 130, or portions thereof, may be stored in a remote memory storage device. Thus, e.g., as depicted in FIG. 1, remote application programs 189 may reside on a memory device of remote computer 182. It will be appreciated that the network connections shown and described are exemplary and other means of establishing a communications link between the computers may be used.

Techniques for Speeding Up Face Detection

Figure 2:
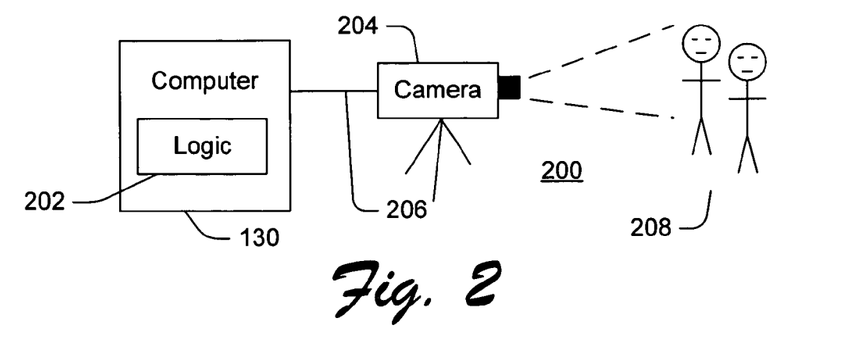
FIG. 2 is an illustrative diagram depicting an exemplary system configured to detect one or more faces, in accordance with certain implementations of the present invention.

Exemplary System Arrangement:

Reference is made to FIG. 2, which is a block diagram depicting an exemplary system 200 that is configured to detect one or more faces, in accordance with certain implementations of the present invention.

System 200 includes logic 202, which is illustrated in this example as being operatively configured within computer 130. Those skilled in the art will recognize that all or part of logic 202 may be implemented in other like devices. As used herein, the term logic is representative of any applicable form of logic capable of performing selected functions. Such logic may include, for example, hardware, firmware, software, or any combination thereof.

System 200 further includes a camera 206 that is capable of providing digital image data to logic 202 through an interface 206. Camera 204 may include, for example, a video camera, a digital still camera, and/or any other device that is capable of capturing applicable image information for use by logic 202. In certain implementations, the image information includes digital image data. Analog image information may also be captured and converted to corresponding digital image data by one or more components of system 200. Such cameras and related techniques are well known. As illustratively shown, camera 204 is capable of capturing images that include subjects 208 (e.g., people and more specifically their faces).

Interface 206 is representative of any type(s) of communication interfaces/resources that can be configured to transfer the image information and any other like information as necessary between camera 204 and logic 202. In certain implementations, the image information includes digital image data. As such, for example, interface 206 may include a wired interface, a wireless interface, a transportable computer-readable medium, a network, the Internet, etc.

Face Detection References:

A variety of face detection techniques are known and continue to be adapted and improved upon. It is beyond the scope of this description to provide an educational introduction to such well-known techniques. Thus, readers that are interested in learning more are directed to the following exemplary references:

[1] A. Pentland, B. Moghaddam, and T. Starner. "View-based and Modular Eigenspaces of Face Recognition". Proc. of IEEE Computer Soc. Conf. on Computer Vision and Pattern Recognition, pp. 84–91, June 1994. Seattle, Wash.

[2] C. P. Papageorgiou, M. Oren, and T. Poggio. "A general framework for object detection". Proc. of International Conf. on Computer Vision, 1998.

[3] D. Roth, M. Yang, and N. Ahuja. "A snowbased face detection". Neural Information Processing, 12, 2000.

[4] E. Osuna, R. Freund, and F. Girosi. "Training support vector machines: an application to face detection". Proc. IEEE Computer Soc. Conf. on Computer Vision and Pattern Recognition, 1997.

[5] F. Fleuret and D. Geman. "Coarse-to-fine face detection". International Journal of Computer Vision 20 (2001) 1157–1163.

[6] H. Schneiderman and T. Kanade. "A Statistical Method for 3D Object Detection Applied to Faces and Cars". Proc. IEEE Computer Soc. Conf. on Computer Vision and Pattern Recognition, 2000.

[7] H. A. Rowley, S. Baluja, and T. Kanade. "Neural network-based face 24 detection". IEEE Transactions on Pattern Analysis and Machine Intelligence 20 (1998), pages 22–38.

[8] H. A. Rowley. Neural Network-Based Face Detection, Ph.D. thesis. CMU-CS-99-117.

[9] J. Ng and S. Gong. "Performing multi-view face detection and pose estimation using a composite support vector machine across the view sphere". Proc. IEEE International Workshop on Recognition, Analysis, and Tracking of Faces and Gestures in Real-Time Systems, pages 14–21, Corfu, Greece, September 1999.

[10] M. Bichsel and A. P. Pentland. "Human face recognition and the face image set's topology". CVGIP: Image Understanding, 59:254–261, 1994.

[11] P. Viola and M. Jones. "Robust real time object detection". IEEE ICCV Workshop on Statistical and Computational Theories of Vision, Vancouver, Canada, Jul. 13, 2001.

[12] R. E. Schapire. "The boosting approach to machine learning: An overview". MSRI Workshop on Nonlinear Estimation and Classification, 2002.

[13] R. L. Hsu, M. Abdel-Mottaleb, and A. K. Jain, "Face Detection in Color Images," IEEE Trans. on Pattern Analysis and Machine Intelligence Vol. 24, No. 5, pp 696–706, 2002.

[14] S. Z. Li, et al. "Statistical Learning of Multi-View Face Detection". Proc. of the 7the European Conf. on Computer Vision. Copenhagen, Denmark. May, 2002.

[15] T. Poggio and K. K. Sung. "Example-based learning for view-based human face detection". Proc. of the ARPA Image Understanding Workshop, II: 843–850. 1994.

[16] T. Serre, et al. "Feature selection for face detection". AI Memo 1697, Massachusetts Institute of Technology, 2000.

[17] V. N. Vapnik. Statistical Learning Theory. John Wiley and Sons, Inc., New York, 1998.

[18] Y. Freund and R. E. Schapire. "A decision-theoretic generalization of on-line learning and an application to boosting". Journal of Computer and System Sciences, 55(1):119–139, August 1997.

Skin Color Filtering to Speedup Face Detection

Methods, apparatuses and systems will now be described that provide for rapid face detection. More particularly, in this section a novel skin color filter is described that can be implemented to reduce the number of candidate windows within an input image that more complex face detection logic will need to process. This tends to speedup face detection by reducing the processing burden of the other face detection logic. In certain implementations, the skin color filter/filtering is performed as part of a pre-filter/filtering stage. In other exemplary implementations the skin color filter/filtering is included within the face detector logic.

Figure 3:
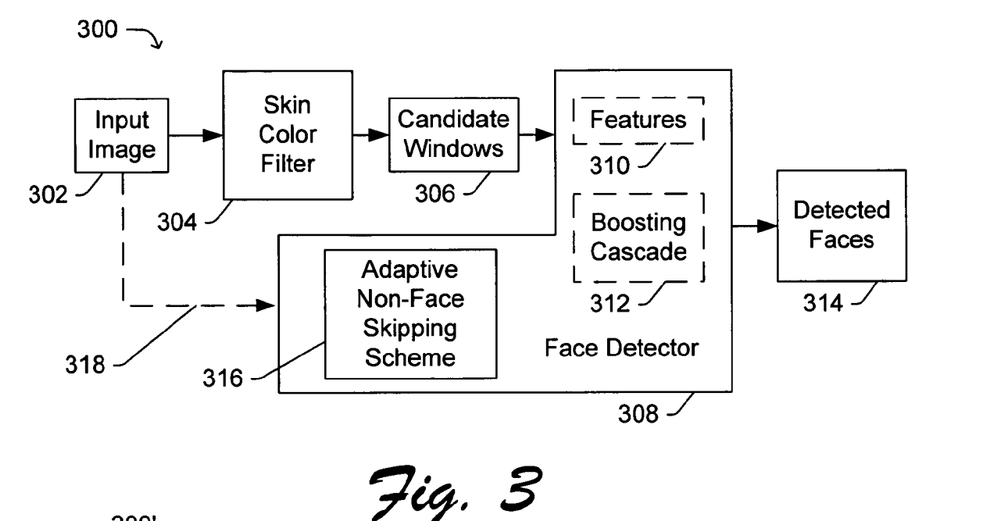
FIG. 3 is a block diagram depicting exemplary logic configured to speedup face detection, in accordance with certain implementations of the present invention.

Attention is drawn to FIG. 3, which is a block diagram depicting an arrangement 300 having data and functions that can be implemented in logic 202, for example. Here, input image 302 is provided to a skin color filter 304. Input image 302 includes, for example, raw digital image data. Skin color filter 304 is configured to process an initial set of candidate windows within input image 302 and output a reduced subset of candidate windows 306. Candidate windows 306 are then provided to or otherwise accessed by face detector 308. Note that in arrangement 300, skin color filter 304 is configured as a pre-filter. Skin color filter 304 is described in greater detail in subsequent sections.

A variety of conventional face detection techniques/schemes may be implemented in face detector 308. By way of example and not limitation, in certain implementations face detector 308 employs features 310, such as, e.g., Haar-like features, to classify candidate windows 306 as having face data or non-face data using a boosting cascade 312. Such conventional techniques, for example, are described in Viola et al. [11].

Face detector 312 in this example is configured to output detected faces 314. Detected faces 314 may include, for example, specified portions of input image 302 that are likely to include face data.

Also depicted in arrangement 300, is an adaptive non-face skipping scheme 316 that in this example is implemented within face detector 308, in accordance with certain further aspects of the present invention. Adaptive non-face skipping scheme 316, which is described in greater detail in subsequent sections, is configured to further reduce the number of candidate windows that face detector 308 processes. This tends to speedup face detection.

While exemplary arrangement 300 includes both adaptive non-face skipping scheme 316 and skin color filter 304, it should be clear that in other implementations of the present invention only one of these novel techniques may be implemented. For example, face detector 308 with adaptive non-face skipping scheme 316 can be configured to receive or otherwise access input image 302 directly (e.g., as represented by dashed line 318) when the arrangement does not include skin color filter 304. Conversely, in other implementations, face detector 308 processes candidate windows 306 from skin color filter 304, but does not include adaptive non-face skipping scheme 316.

Figure 4:
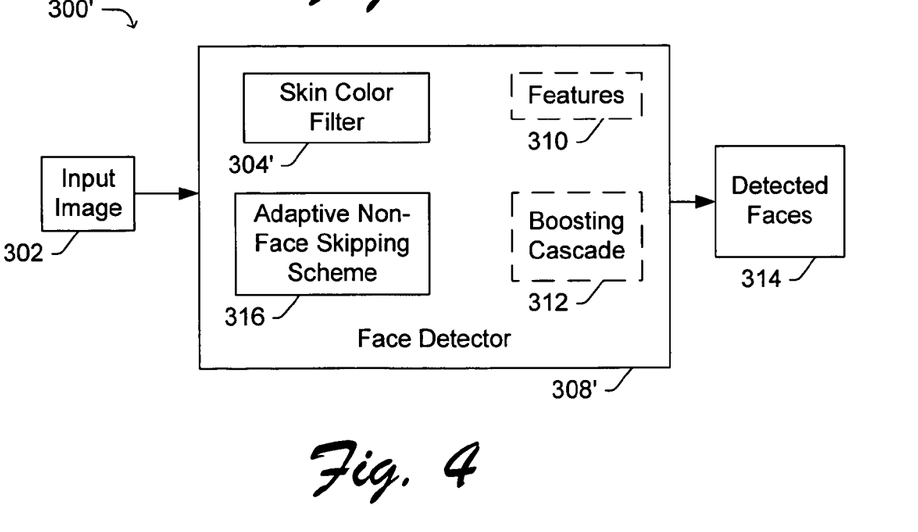
FIG. 4 is an illustrative diagram depicting exemplary logic configured to speedup face detection, in accordance with certain further implementations of the present invention.

Attention is drawn to FIG. 4, which is similar to FIG., 3 and illustrates that in an exemplary arrangement 300' a face detector 308' may include a skin color filter 304' that is not part of a pre-filtering stage but rather integral to the face detector logic.

To examine if a face is located within input image 302, millions of candidate windows need to be examined usually at many different possible positions and/or many different scales (e.g., scaled down/up images and/or classifiers). One of the more effective ways to accelerate face detection, therefore, is to reduce the number of candidate windows that need to be processed. This is a shared goal for skin color filter 304 and adaptive non-face skipping scheme 316.

As illustrated in the example arrangements above, skin color filter 304 is configured to reject substantial non-face candidate windows before they need to be processed/classified by the typically more computationally complex face detector 308.

Within skin color filter 308, for example, each pixel in each candidate window is classified as being skin or non-skin based on the pixel's color information. The color information is related to the color space that input image 302 and logic 202 is configured to handle.

By way of example, in accordance with certain aspects of the present invention, the color space includes luminance and chrominance information (e.g., a YCrCb color space). In other implementations, for example, the color space may include red, green and blue color information (e.g., an RGB color space). These color spaces are related, for example, by:

$$\begin{cases} Y = 0.2990*r + 0.5870*g + 0.1140*b \\ Cr = 0.5000*r - 0.4187*g - 0.0813*b \\ Cb = -0.1687*r - 0.3313*g + 0.5000*b \end{cases}$$

where r, g, b denotes a pixel in RGB color space, and Y, Cr, Cb denote the corresponding pixel in YCrCb color space. Then a pixel can be classified by skin color filter 304 as skin or non-skin based on logic such as:

$$\text{skin} = \begin{cases} \text{true}, & \text{if } (Cr - 1.2*Cb + 12 \geq 0) \text{ and } (Cr + 0.675*Cb + 2.5 \geq 0) \\ \text{false} & \text{otherwise} \end{cases}$$

or conversely, $$\text{non-skin} = \begin{cases} \text{false}, & \text{if } (Cr - 1.2*Cb + 12 \geq 0) \text{ and } (Cr + 0.675*Cb + 2.5 \geq 0) \\ \text{true} & \text{otherwise} \end{cases}$$

Those skilled in the art will recognize that functions examined in the equations above are merely examples and that other like functions can be employed.

Based on such skin classification results, for example, if the number of skin color pixels in a candidate window is lower than a determined threshold $T=\alpha*W*H$ (W and H are the width and height of the candidate window and $\alpha$, is a weight parameter, for example), then the candidate window can be skipped and need not to be classified by the complex face detector. Here, for example, a skipped or non-face candidate window will not be included in candidate windows 306. In accordance with certain implementations it was found empirically that a between about 0.3 and about 0.7 may provide acceptable performance. In certain other implementations, it was found that an $\alpha$ equal to about 0.5 results in good performance. The higher the threshold, the more candidate windows will be skipped. But too small a threshold may decrease the recall rate of the face detection.

To further speedup the calculation of skin pixel numbers in a candidate window, an integral image may be used to accelerate the calculation. Integral images are well-known (see, e.g., Viola et al. [11]). An integral image, for example, accelerates the computation of Haar-like features, and is basically an intermediate representation of the input image. The value of each point (s,t) in a integral image is defines as:

$$ii(s, t) = \sum_{s' \leq s, t' \leq t} i(s', t')$$

where i(s',t') is a gray scale value of the original image data. Based on this definition, the mean of the pixels within a rectangle in the original image can be computed using only a few summation operations.

Interestingly, for "gray" color pixels, r=g=b yields to Cr=0 and Cb=0. Therefore, in certain implementations a gray color pixel can always be classified as skin. Thus, in such an example, skin color filter 304 will not negatively affect gray images.

It has been found that skin color filter 304 is especially effectual for images that include significant amounts of scenery data, e.g., sky, water, grass, etc. For example, in certain experiments about 80%–90% of the candidate windows within such scenic images was filtered out by color filter 304.

Figure 5:
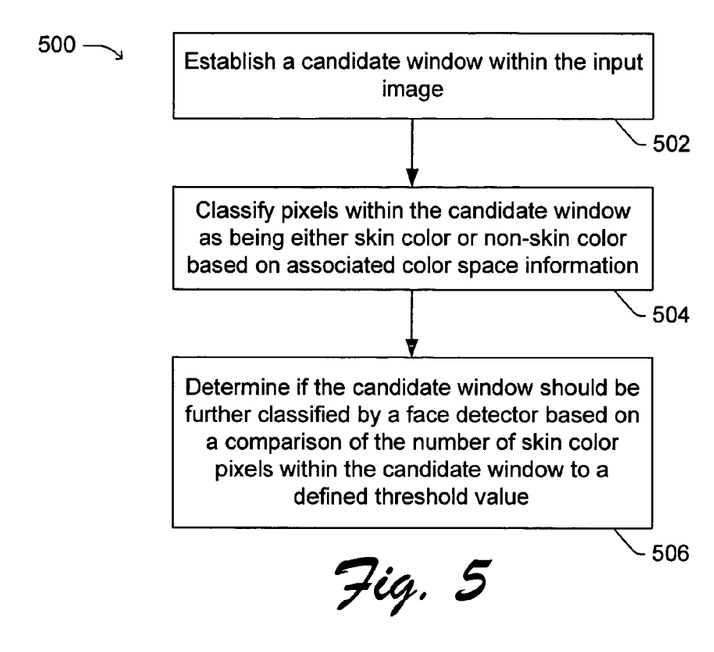
FIG. 5 is a flow diagram depicting of an exemplary skin color filter process that can be configured to speedup face detection, in accordance with certain implementations of the present invention.

Attention is drawn to FIG. 5, which is a follow diagram depicting an exemplary method 500 that can be implemented in skin color filter 304, for example. In act 502, at least one candidate window is established within the input image. In act 504, pixels within the candidate window are classified as being either skin or non-skin based on color space information. In certain implementations, all of the pixels within the candidate window are thusly classified. In other implementations, act 504 may only need to classify a portion of the pixels within the candidate window, for example, as needed to support the determination made in act 506. The portion of pixels classified in act 504, and/or the order in which the pixels are processed can be configured to further promote efficiency, for example. In act 506, it is determined if the candidate window should be further classified by a face detector based a comparison of the number of skin color pixels within the candidate window to a defined threshold value.

Adaptive Non-Face Skipping Scheme to Speedup Face Detection

In accordance with certain exemplary implementations, for different scales, face detector 308 can be configured to scan across a location in the image sequentially. Subsequent locations can be obtained by shifting the candidate window from left to right, from top to down. If a candidate window is rejected by face detector 308 and has a very low confidence score, then it has been found that one or more of its neighboring candidate windows is unlikely to include face data and as such the neighboring candidate window(s) can be skipped by face detector 308.

For different face detection algorithms, the confidence measure(s) may be different. For illustration purposes, in certain implementations, boosting cascade 312 includes twelve layers including a simple classifier (layer 1) and increasingly more complex classifiers (layers 2–12). Thus, in this example, if a candidate window is rejected within only 2 or 3 layers of the cascade classifier, it was found that the right and lower 2×2 neighborhood candidate windows may be skipped, for example.

For other face detection algorithms/techniques, adaptive non-face skipping scheme 316 can be operatively similar. The confidence output basically measures a degree to which a candidate window is likely to include face data and/or non-face data. In the boosting based face detection, one may therefore use the layer number that a candidate window passes through as a confidence score.

Adaptive non-face skipping scheme 316 can be very effective because highly overlapped candidate windows are highly linearly correlated. On average, in certain experiments it was found that about 70% of candidate windows can be skipped, without significantly degrading the recall rate. Moreover, by combining skin color filter 304 and adaptive non-face skipping scheme 316, it was found that the face detection speeds can be, on average, increased by about two to three times.

Figure 6:
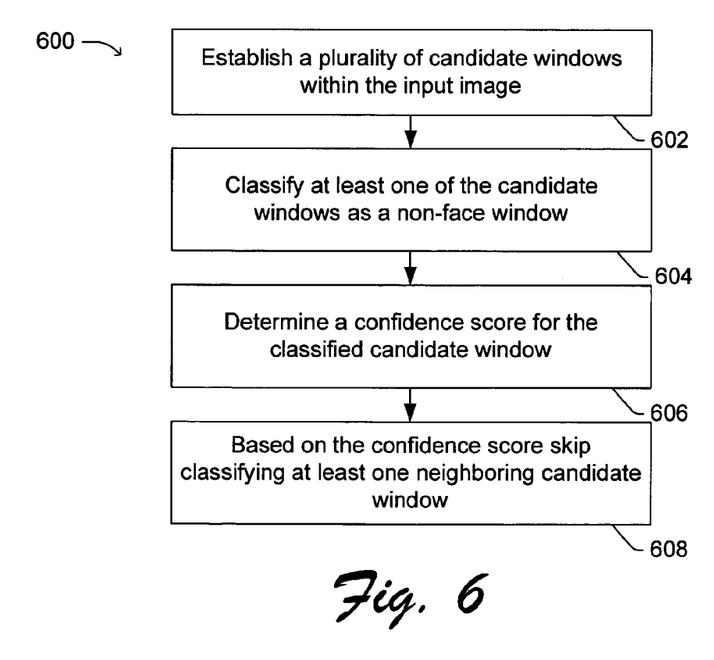
FIG. 6 is a flow diagram depicting of an exemplary adaptive non-face skipping process that can be configured to speedup face detection, in accordance with certain further implementations of the present invention.

Attention is drawn to FIG. 6, which is a flow diagram depicting a method 600 that can be implemented, for example, in adaptive non-face skipping scheme 316, face detector 308, and/or logic 202. Act 602 includes establishing a plurality of candidate windows within an input image 302. Act 604 includes classifying at least one of the candidate windows as a non-face window. Act 606 includes determining a confidence score for the classified candidate window. In act 608, based on the confidence score, the method includes skipping the classification of at least one neighboring candidate window. Act 608, may include automatically classifying the skipped neighboring candidate window to match that of the classified candidate window.

CONCLUSION

Although the invention has been described in language specific to structural features and/or methodological acts, it is to be understood that the invention defined in the appended claims is not necessarily limited to the specific features or steps described.

What is claimed is:

1. A method for use in face detection, the method comprising:
    establishing a plurality of initial candidate windows within a digital image, said digital image having a plurality of pixels represented by color space information;
    for each initial candidate window, examining said color space information for each of at least a portion of said pixels within said initial candidate window and classifying each of said examined pixels as being either a skin color pixel or a non-skin color pixel; and
    establishing a plurality of subsequent candidate windows that includes at least a portion of said initial candidate windows based on said classified pixels within each of said initial candidate windows;
    wherein classifying each of said examined pixels as either said skin color pixel or said non-skin color pixel further includes classifying "gray" pixels as skin color pixels; and
    wherein said "gray" pixels have associated chrominance information Cr and Cb substantially equal to zero.

2. The method as recited in claim 1, wherein said color space information includes at least chrominance information.

3. The method as recited in claim 2, wherein said color space information includes luminance information.

4. The method as recited in claim 3, wherein said color space information includes Y, Cr and Cb information.

5. The method as recited in claim 1, wherein said color space information includes red (R), green (G) and blue (B) color information.

6. The method as recited in claim 1, wherein classifying each of said examined pixels as either said skin color pixel or said non-skin color pixel further includes applying logic based on $$\text{skin} = \begin{cases} \text{true,} & \text{if } (Cr - 1.2*Cb + 12 \geq 0) \text{ and } (Cr + 0.675*Cb + 2.5 \geq 0) \\ \text{false} & \text{otherwise} \end{cases},$$

wherein Cr and Gb represent chrominance information associated with said pixel being classified.

7. The method as recited in claim 1, wherein classifying each of said examined pixels as either said skin color pixel or said non-skin color pixel further includes applying logic based on $$\text{non-skin} = \begin{cases} \text{false,} & \text{if } (Cr - 1.2*Cb + 12 \geq 0) \text{ and } (Cr + 0.675*Cb + 2.5 \geq 0) \\ \text{true} & \text{otherwise} \end{cases},$$

wherein Cr and Cb represent chrominance information associated with said pixel being classified.

8. The method as recited in claim 1, wherein classifying each of said examined pixels as either said skin color pixel or said non-skin color pixel further includes converting RGB color space information to at least corresponding chrominance information Cr and Cb as follows:

$Cr=0.5000*r-0.4187*g-0.0813*b$ and
$Cb=-0.1687*r-0.3313*g=0.5000*b$, wherein r is red color information, g is green color information, and b is blue color information for said pixel being examined.

9. The method as recited in claim 8, wherein convening said RGB color space information further includes converting said RGB color space information to corresponding luminance information Y as follows:

$Y=0.2990*r0.5870*g=0.1140*b$.

10. The method as recited in claim 1, wherein establishing said is plurality of subsequent candidate windows further includes, for each of said initial candidate windows, comparing a total number of said skin color classified pixels with a threshold value and based on said comparison identifying said initial candidate window as one of said subsequent candidate windows.

11. The method as recited in claim 10, wherein said threshold value is determined as $T=\alpha*W*H$, wherein T is said threshold value, W is a width of said initial candidate window, H is a height of said initial candidate window, and $\alpha$ is a weight parameter greater than zero.

12. The method as recited in claim 11, wherein $\alpha$ between 0.3 and 0.7.

13. The method as recited in claim 12, wherein $\alpha$ is 0.5.

14. The method as recited in claim 1, wherein establishing said plurality of subsequent candidate windows further includes, for each of said initial candidate windows, comparing a total number of said non-skin color classified pixels with a threshold value and based on said comparison identifying said initial candidate window as one of said subsequent candidate windows.

15. The method as recited in claim 14, wherein said threshold value is determined as T=α*W*H, wherein T is said threshold value, W is a width of said initial candidate window, H is a height of said initial candidate window, and α is a weight parameter greater than zero.

16. The method as recited in claim 15, wherein α between 0.3 and 0.7.

17. The method as recited in claim 16, wherein a is 0.5.

18. The method as recited in claim 1, wherein at least one of said initial candidate windows includes an intermediate representation of at least a portion of said digital image.

19. The method as recited in claim 18, wherein said intermediate representation includes an integral image.

20. The method as recited in claim 1, further comprising: processing said subsequent candidate windows using a face detector.

21. The method as recited in claim 20, wherein processing said subsequent candidate windows using a face detector further includes:
applying an adaptive non-face skipping scheme to establish a plurality of further processed candidate windows that includes a subset of said plurality of subsequent candidate windows.

22. A computer-readable medium having computer-implementable instructions for causing one or more processing units to perform acts comprising:
establishing a plurality of initial candidate windows within a digital image, said digital image having a plurality of pixels represented by color space information;
for each initial candidate window, examining said color space information for each of at least a portion of said pixels within said initial candidate window;
classifying each of said examined pixels as being either a skin color pixel or a non-skin color pixel; and
establishing a plurality of subsequent candidate windows that includes at least a portion of said initial candidate windows based on said classified pixels within each of said initial candidate windows;
wherein classifying each of said examined pixels as either said skin color pixel or said non-skin color pixel further includes classifying "gray" pixels as skin color pixels; and
wherein said "gray" pixels have associated chrominance information Cr and Cb substantially equal to zero.

23. The computer-readable medium as recited in claim 22, wherein said color space information includes at least chrominance information.

24. The computer-readable medium as recited in claim 23, wherein said color space information includes luminance information.

25. The computer-readable medium as recited in claim 24, wherein said color space information includes Y, Cr and Cb information.

26. The computer-readable medium as recited in claim 22, wherein said color space information includes red (R), green (G) and blue (B) color information.

27. The computer-readable medium as recited in claim 22, wherein classifying each of said examined pixels as either said skin color pixel or said non-skin color pixel further includes applying logic based on $$\text{skin} = \begin{cases} \text{true}, & \text{if } (Cr - 1.2*Cb + 12 \geq 0) \text{ and } (Cr + 0.675*Cb + 2.5 \geq 0) \\ \text{false} & \text{otherwise} \end{cases},$$

wherein Cr and Cb represent chrominance information associated with said pixel being classified.

28. The computer-readable medium as recited in claim 22, wherein classifying each of said examined pixels as either said skin color pixel or said non-skin color pixel further includes applying logic based on $$\text{non-skin} = \begin{cases} \text{false}, & \text{if } (Cr - 1.2*Cb + 12 \geq 0) \text{ and } (Cr + 0.675*Cb + 2.5 \geq 0) \\ \text{true} & \text{otherwise} \end{cases},$$

wherein Cr and Cb represent chrominance information associated with said pixel being classified.

29. The computer-readable medium as recited in claim 22, wherein classifying each of said examined pixels as either said skin color pixel or said non-skin color pixel further includes converting RGB color space information to at least corresponding chrominance information Cr and Cb as follows:

$Cr=0.5000*r-0.4187*g-0.0813*b$ and
$Cb=-0.1687*r\ 0.3313*g=0.5000*b,$ wherein r is red color information, g is green color information, and b is blue color information for said pixel being examined.

30. The computer-readable medium as recited in claim 29, wherein converting said RUB color space information further includes converting said RUB color space information to corresponding luminance information Y as follows:

$Y=0.2990*r=0.5870*g=0.1140*b.$

31. The computer-readable medium as recited in claim 22, wherein establishing said plurality of subsequent candidate windows further includes, for each of said initial candidate windows, comparing a total number of said skin color classified pixels with a threshold value and based on said comparison identifying said initial candidate window as one of said subsequent candidate windows.

32. The computer-readable medium as recited in claim 31, wherein said threshold value is determined as T=α*W*H wherein T is said threshold value, W is a width of said initial candidate window, H is a height of said is initial candidate window, and α is a weight parameter greater than zero.

33. The computer-readable medium as recited in claim 32, wherein a between 0.3 and 0.7.

34. The computer-readable medium as recited in claim 33, wherein α is 0.5.

35. The computer-readable medium as recited in claim 22, wherein establishing said plurality of subsequent candidate windows further includes, for each of said initial candidate windows, comparing a total number of said non-skin color classified pixels with a threshold value and based on said comparison identifying said initial candidate window as one of said subsequent candidate windows.

36. The computer-readable medium as recited in claim 35, wherein said threshold value is determined as T=α*W*H, wherein T is said threshold value, W is a width of said initial candidate window, H is a height of said initial candidate window, and α is a weight parameter greater than zero.

37. The computer-readable medium as recited in claim 36, wherein α between 0.3 and 0.7.

38. The computer-readable medium as recited in claim 37, wherein α 0.5.

39. The computer-readable medium as recited in claim 22, wherein at least one of said initial candidate windows includes an intermediate representation of at least a portion of said digital image.

40. The computer-readable medium as recited in claim 39, wherein said intermediate representation includes an integral image.

41. The computer-readable medium as recited in claim 22, further comprising processing said subsequent candidate windows using a face detector.

42. The computer-readable medium as recited in claim 41, wherein processing said subsequent candidate windows using a face detector further includes:
applying an adaptive non-face skipping scheme to establish a plurality of further processed candidate windows that includes a subset of said plurality of subsequent candidate windows.

43. An apparatus for use in face detection, the apparatus comprising:
memory suitable for storing a digital image having a plurality of image pixels represented by color space information; and
logic operatively coupled to said memory and configured to:
establish a plurality of initial candidate windows using said digital image, wherein each initial candidate window including pixels associated with at least a portion of said image pixels,
for each initial candidate window, examine said color space information for each of at feast a portion of said pixels within said initial candidate window and classifying each of said examined pixels as being either a skin color pixel or a non-skin color pixel, and
establish a plurality of subsequent candidate windows that includes at least a portion of said initial candidate windows based on said classified pixels within each of said initial candidate windows;
wherein said logic is further configured to classify "gray" pixels as skin color pixels; and
wherein said "gray" pixels have associated chrominance information Cr and Cb substantially equal to zero.

44. The apparatus as recited in claim 43, wherein said color space information includes at least chrominance information and luminance information.

45. The apparatus as recited in claim 43, wherein said color space information includes red (R), green (G) and blue (B) color information.

46. The apparatus as recited in claim 43, wherein logic is configured to classify each of said examined pixels as either said skin color pixel or said non-skin color pixel based on $$\text{skin} = \begin{cases} \text{true,} & \text{if } (Cr - 1.2*Cb + 12 \geq 0) \text{ and } (Cr + 0.675*Cb + 2.5 \geq 0) \\ \text{false} & \text{otherwise} \end{cases},$$

wherein Cr and Cb represent chrominance information associated with said pixel being classified.

47. The apparatus as recited in claim 43, wherein logic is configured to classify each of said examined pixels as either said skin color pixel or said non-skin color pixel based on $$\text{non-skin} = \begin{cases} \text{false,} & \text{if } (Cr - 1.2*Cb + 12 \geq 0) \text{ and } (Cr + 0.675*Cb + 2.5 \geq 0) \\ \text{true} & \text{otherwise} \end{cases},$$

wherein Cr and Cb represent chrominance information associated with said pixel being classified.

48. The apparatus as recited in claim 43, wherein said logic is further configured to convert RGB color space information to at least corresponding chrominance information Cr and Cb as follows:

$$Cr = 0.5000*r - 0.4187*g - 0.0813*b \text{ and}$$
$$Cb = -0.1687*r - 0.3313*g = 0.5000*b,$$

wherein r is red color information, g is green color information, and b is blue color information for said pixel being examined.

49. The apparatus as recited in claim 43, wherein said logic is further configured to:
for each of said initial candidate windows, compare a total number of said skin color classified pixels with a threshold value, and
based on said comparison, identify said initial candidate window as one of said subsequent candidate windows.

50. The apparatus as recited in claim 49, wherein said threshold value is determined by said logic as T=α*W*H, wherein T is said threshold value, W is a width of said initial candidate window, H is a height of said initial candidate window, and α is a weight parameter greater than zero, and wherein α is between about 0.3 and about 0.7.

51. The apparatus as recited in claim 43, wherein said logic is further configured to:
for each of said initial candidate windows, comparing a total number of said non-skin color classified pixels with a threshold value, and
based on said comparison identify said initial candidate window as one of said subsequent candidate windows.

52. The apparatus as recited in claim 51, wherein said threshold value is determined by said logic as T=α*W*H, wherein T is said threshold value, W is a width of said initial candidate window, H is a height of said initial candidate window, and α is a weight parameter greater than zero, and wherein α is between about 0.3 and about 0.7.

53. The apparatus as recited in claim 43, wherein at least one of said initial candidate windows includes an intermediate representation of at least a portion of said digital image.

54. The apparatus as recited in claim 53, wherein said intermediate representation includes an integral image.

55. The apparatus as recited in claim 43, further comprising:
face detector logic operatively coupled to said memory and configured to process said subsequent candidate windows.

56. The apparatus as recited in claim 55, wherein said face detector logic is configured to:
apply an adaptive non-face skipping scheme to establish a plurality of further processed candidate windows that includes a subset of said plurality of subsequent candidate windows.

* * * * *